United States Patent
Wright et al.

(10) Patent No.: US 9,554,280 B2
(45) Date of Patent: Jan. 24, 2017

(54) METHOD FOR MANAGING DATA COMMUNICATION BETWEEN A COMMUNICATION DEVICE AND ANOTHER DEVICE AND COMMUNICATION DEVICE

(75) Inventors: Timothy J. Wright, Reading (GB); Dean H. Vogler, Algonquin, IL (US); Joel D. Voss, Elkhorn, WI (US)

(73) Assignee: Google Technology Holdings LLC, Mountain View, CA (US)

( * ) Notice: Subject to any disclaimer, the term of this patent is extended or adjusted under 35 U.S.C. 154(b) by 822 days.

(21) Appl. No.: 12/639,192

(22) Filed: Dec. 16, 2009

(65) Prior Publication Data

US 2011/0141953 A1    Jun. 16, 2011

(51) Int. Cl.
*H04W 12/10*    (2009.01)
*H04W 4/00*    (2009.01)
*H04L 29/06*    (2006.01)

(52) U.S. Cl.
CPC ............. *H04W 12/10* (2013.01); *H04L 63/123* (2013.01); *H04W 4/003* (2013.01); *H04L 2463/081* (2013.01); *H04W 4/005* (2013.01)

(58) Field of Classification Search
CPC ..... H04L 2463/08; H04L 63/12; H04W 12/10; H04W 4/00
See application file for complete search history.

(56) References Cited

U.S. PATENT DOCUMENTS 5,014,260 A * 5/1991 Wicklund ................... 370/232
5,910,987 A * 6/1999 Ginter ................... G06F 21/10
                                              348/E5.006

(Continued)

FOREIGN PATENT DOCUMENTS

WO    2006045343 A1    5/2006
WO    2009105542 A2    8/2009

OTHER PUBLICATIONS

"3rd Generation Partnership Project; Technical Specification Group Services and System Aspects; Feasibility Study on the Security Aspects of Remote Provisioning and Change of Subscription for M2M Equipment; (Release 9)", 3GPP Draft; S3-092254-V2_TR33812-160_CB, 3rd Generation Partnership Project (3GPP), Mobile Competence Centre; 650, Route Des Lucioles; F-06921 Sophia-Antipolis Cedex; France, vol. SA WG3, no. Dublin; 200911156, Nov. 22, 2009, sections 5.1.2, 5.1.3.3, 6.1.2.3, 6.1.2.5.

(Continued)

*Primary Examiner* — Xavier S. Wong
(74) *Attorney, Agent, or Firm* — Lerner, David Littenberg, Krumholz & Mentlik, LLP

(57) ABSTRACT

A method for managing data communication between a communication device (102) and another device (112) in a communication network, comprises providing (500) data for transmission by the communication device (102), and controlling by at least one secure management element (300, 304) operating in a secure environment (218) in the communication device the transmission of the provided data by the communication device so as to manage data transmitted by the communication device. The step of controlling may include at least one of controlling an amount of data transmitted, controlling a time of transmission of data and controlling a periodicity of transmission of data. A communication device and a method of managing data received by a communication device are also described.

13 Claims, 6 Drawing Sheets

(56) References Cited

U.S. PATENT DOCUMENTS

| | | | |
|---|---|---|---|
| 2003/0007643 A1* | 1/2003 | Ben-Zur et al. | 380/277 |
| 2007/0050622 A1* | 3/2007 | Rager et al. | 713/168 |
| 2007/0154014 A1 | 7/2007 | Aissi et al. | |
| 2007/0204159 A1* | 8/2007 | Hara | 713/171 |
| 2008/0013729 A1* | 1/2008 | Vialen et al. | 380/270 |
| 2008/0148400 A1* | 6/2008 | Barron et al. | 726/22 |
| 2010/0332828 A1* | 12/2010 | Goto | 713/168 |

OTHER PUBLICATIONS

Patent Cooperation Treaty, International Search Report and Written Opinion of the International Searching Authority for International Application No. PCT/US2010/060158, Feb. 25, 2011, 11 pages.

\* cited by examiner

METHOD FOR MANAGING DATA COMMUNICATION BETWEEN A COMMUNICATION DEVICE AND ANOTHER DEVICE AND COMMUNICATION DEVICE

FIELD OF THE DISCLOSURE

This disclosure relates to a method for managing data communication between a communication device and another device in a communication network and a communication device.

BACKGROUND OF THE DISCLOSURE

Machine to Machine (M2M) systems typically use unmanned devices to establish communication and exchange information with a central network so that the central network can receive data from or transmit data to each unmanned device for processing. M2M devices may include unmanned wireless devices or wireline devices which are used in applications such as metering, parcel tracking, telematics, embedded modems for CCTV cameras and consumer electronic devices such as camcorders, cameras, and cable modems, and similar applications. Since the M2M devices may be embedded in other devices, M2M devices are typically required to be small, and low cost devices. In addition, although M2M devices may be deployed in large volumes, each M2M device may communicate small amounts of data which, for example, in wireless systems, results in low revenue for the operator. More information on M2M systems can be found in the 3GPP standard specification TR 22.868 entitled 'Study on Facilitating Machine to Machine Communication in 3GPP Systems', the entire disclosure of which is incorporated herein by reference.

Thus, it is desirable to reduce the cost of M2M devices.

BRIEF DESCRIPTION OF THE DRAWINGS

A method for managing data communication between a communication device and another device in a communication network and a communication device, in accordance with the disclosure will now be described, by way of example only, with reference to the accompanying drawings in which.

DETAILED DESCRIPTION OF THE DRAWINGS

In the following description, examples of embodiments of the disclosure will be described with respect to a wireless device operating within a wireless communication network, including, for example, a GSM cellular communication system or a 3rd generation cellular communication system such as an Universal Mobile Telecommunication system (UMTS), or Long Term Evolution (LTE) communication system. It will however be appreciated the present disclosure can be used in other types of communication devices and networks, such as a wireline communication device or any electronic device having the capability to communicate with another device in a network, such as a digital camera having a built-in modem, an embedded modem/communications device for a car, utility meters, remote health sensors, remote diagnostics apparatus, road tolling apparatus, wireless point of sales terminals, vending machines or a cable modem or similar devices. The disclosure will be described for communication devices suitable for machine to machine (M2M) applications. It will however be appreciated that it is not intended to limit the disclosure to communication devices for M2M applications.

Figure 1:
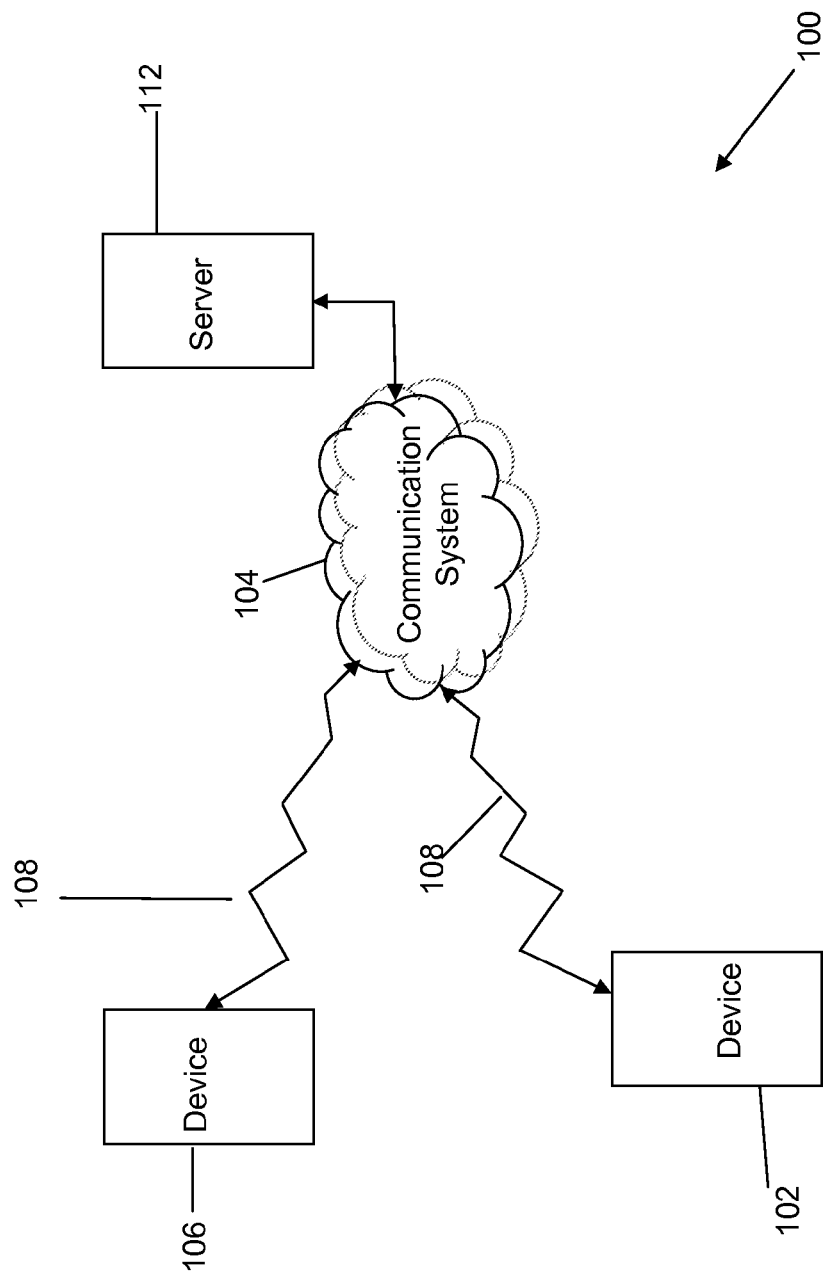
FIG. 1 is a block schematic diagram of a communication network in accordance with an embodiment of the disclosure.

Referring firstly to FIG. 1, a communication network 100 comprises a plurality of communication devices 102, 106 capable of communicating with another device in the communication network 100 via a communication system 104, such as a GSM communication system. In the following, the communication system will be described as a GSM communication system but it will be appreciated that the disclosure may apply to any communication system and it is not intended to limit the disclosure to a GSM communication system. As is well known, the GSM communication system 104 provides a plurality of coverage areas or cells (not shown) served by base stations (not shown) with which the communication devices 102, 106 can operate or communicate via radio communication links (such as links 108 shown in FIG. 1).

In an example, the communication devices 102 and 106 are wireless communication devices which are part of an M2M system. The communication devices 102 and 106 communicate with a server 112 in the communication network 100 via the GSM communication system 104. The M2M system may be, for example, a telematics system in which case devices 102 and 106 are wireless beacon devices transmitting traffic information to the server 112 for managing traffic information. For M2M applications, the communication devices 102 and 106 are typically unmanned. In other words, the devices 102 and 106 typically operate autonomously without a user controlling their normal operation. As discussed in the introduction, as M2M devices generally do not communicate large amounts of data, the communication resources of the communication network 100 required by devices 102, 106 will be significantly smaller than other wireless devices, such as cellular telephones.

Figure 2:
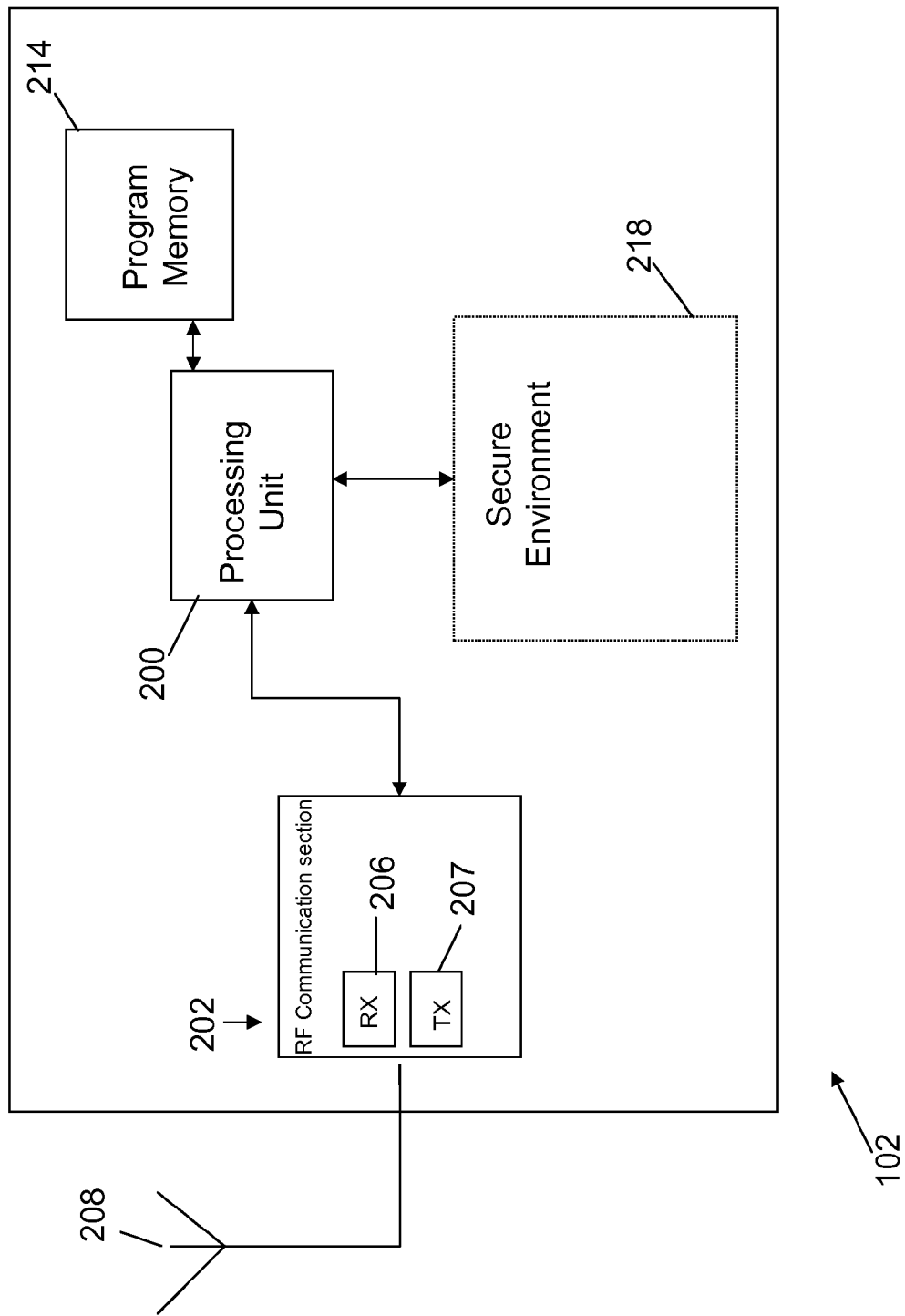
FIG. 2 is a block schematic diagram of a communication device in accordance with an embodiment of the disclosure.

FIG. 2 is a block diagram of a wireless communication device, such as the wireless communication device 102 shown in FIG. 1, in accordance with an embodiment of the disclosure. As will be apparent to a skilled person, FIG. 2 shows only the main functional components of an exemplary wireless communication device 102 that are necessary for an understanding of the invention. The wireless communication device 102 may be a mobile phone, subscriber unit, wireless user equipment, a portable telephone, wireless video or multimedia device, a communication terminal, a personal digital assistant (PDA), a laptop computer, a modem card or any electronic device having wireless capability, such as a digital camera which can transfer pictures wirelessly.

The wireless communication device 102 comprises a processing unit 200 for carrying out operational processing for the wireless communication device 102. The wireless communication device 102 also has a RF communication section 202 for providing wireless communication via a radio communication link 108 with the communication system 104. The RF communication section 202 typically includes an antenna 208, a receiving section 206, and a transmitting section 207. Although not shown in FIG. 2 but as is well known, the receiving section 206 typically includes elements such as a receiver, demodulator, decoder, and the transmitting section 207 typically includes elements such as a transmitter, modulator, coder. The RF communication section 202 is coupled to the processing unit 200.

The mobile device 102 may have a Man Machine Interface MMI (not shown), including elements such as a key pad, microphone, speaker, display screen, for providing an interface between the mobile device 102 and a user of the device. The MMI is also coupled to the processing unit 200.

The processing unit 200 may be a single processor or may comprise two or more processors carrying out the processing required for the operation of the wireless communication device 102. The number of processors and the allocation of processing functions to the processing unit is a matter of design choice for a skilled person. The wireless communication device 102 also has a program memory 214 in which is stored data and programs containing processor instructions for the main operation of the wireless communication device 102. The programs may contain a number of different program elements or sub-routines containing processor instructions for a variety of different tasks for the main operation of the communication device, for example: for processing data received at the receiving section 206, such as signalling information or signalling messages received from the GSM communication system 104 (e.g. paging signals, coding and timing information) and traffic data (e.g. user data); and for processing data for transmission by the transmitting section 207.

Data is provided to the wireless communication device 102 for transmission. The data may be provided by being generated in the wireless communication device or by being generated in another device (e.g. such as a laptop when the wireless communication device is a modem card) and then provided to the wireless communication device 102 for transmission. The data to be managed may include traffic data (e.g. user data such as picture information or traffic information). The data may additionally or alternatively include signalling information such as coding or timing information or protocol handshake messages.

The wireless communication device 102 further comprises at least one secure management element operating in a secure environment 218 in the wireless communication device 102 for controlling the transmission of data by the wireless communication device 102 so as to manage or limit data transmitted by the wireless communication device 102. Data transmitted under the control of the at least one secure management element is or corresponds to or represents valid data which will normally be deemed valid by a receiving device, such as the server 112, and accepted for further processing by the receiving device. Data transmitted but not under the control of the at least one secure management element will normally be rejected by the receiving device as invalid data. For example, in UMTS, GSM and LTE, data which is transmitted from the wireless communication device 102, but not under the control of the at least one secure management element, may be rejected as invalid data at the base station or Radio Network Controller (RNC) or Enhanced Node B (eNodeB) so that invalid data will not be received by the core network.

The at least one secure management element operating in the secure environment 218 may operate or control the transmission of data so as to limit an amount of data transmitted, and/or a time of transmission and/or a periodicity or frequency of transmission. The at least one secure management element may be further arranged to prevent further transmissions of data under the control of the at least one secure management element when the data transmitted by the wireless communication device 102 reaches a limit which limit may include a maximum amount of data or a maximum time limit for transmission. The limit may be stored in the secure environment 218.

The at least one secure management element in accordance with the disclosure can therefore be used to manage the transmission of data from the wireless communication device so that the wireless communication device can manage and control data transmissions rather than the communication network 100. With the at least one secure management element operating in a secure environment, the wireless communication device can manage and control data transmissions securely with reduced risk from tampering and unlawful attacks. By implementing some of the management functions of data transmissions from the communication network to the wireless communication device, the overhead (e.g. processing time and resources) for such management functions in the network can be reduced which can save cost to the operator of the network. This can help reduce the overall cost to the operator of M2M devices.

In addition, since the at least one secure management element can be used to limit valid data transmitted from the wireless communication device, the at least one secure management element can help to ensure normal operation of the wireless communication device and to prevent or minimise the impact of an unlawful attack, such as a Denial of Service attack, on the normal operation of the device. For example, since the at least one secure management element is in the secure environment and so should not be open to unlawful attacks or exploitation, if an entity attempts to compromise the operation of the device, for example by attempting to exploit the device to transmit significant amounts of data as part of a Denial of Service attack on the network, the at least one secure management element will limit the amount of valid data being transmitted and any invalid data sent without the control of the at least one secure management element will be rejected before being received by the core network.

The secure environment 218 is arranged such that it is isolated from the main operation of the wireless communication device (e.g. the main operating system of the device) so that data and program elements running in the secure environment cannot be accessed by the main operating system of the device. The secure environment 218 may thus store data and perform functions securely without being open to unauthorised exploitation or tampering or attack from the main operating system of the wireless communication device 102. The secure environment 218 may be implemented by hardware and/or software.

In the case of implementing the secure environment using hardware, the secure environment may include a secure processing module coupled to the processing unit 200 but which is separate to the processing unit 200 or may be part of the processing unit 200 itself but isolated from the main operations of the processing unit 200, such as may be provided by TrustZone™ technology developed by ARM. The at least one secure management element operates as part of the secure processing module. A separate secure processing module may be integrated into the wireless communication device or may be removable. Irrespective of whether the separate secure processing module is removable or incorporated into the wireless communication device 102, the module may be a dedicated module whose sole function is for controlling the transmission of data so as to limit the data transmitted by the wireless communication device or may be a module that has additional functions, such as providing Near Field Communication (NFC) services and/or integrating the Universal Subscriber Identity Module (USIM) application and/or other functions.

When the secure environment 218 includes a separate secure processing module which is removable, an interface (not shown) is coupled to the processing unit 200 for interfacing between the removable module and the processing unit 200. The removable module may be a Subscriber Identity Module (SIM) card or a Universal Integrated Circuit Card (UICC) which, in addition to storing network specific information used to authenticate and identify the device 102 on the GSM communication system 104 to control access, also stores the at least one secure management element for controlling data transmission and may also store other elements such as NFC application elements. In this case, the interface is a SIM or UICC interface. The UICC card is the name of the standardised platform that can run several telecom applications such as the USIM application for a 3G network, or the SIM application for a 2G network, or others. The UICC card was introduced with the release 99 of the 3GPP standards, and replaces the SIM platform (that has GSM capabilities only).

In the case of implementing the secure environment using software, the secure environment may be provided virtually by arranging for the partitioning or division of the program memory 214 so that a main part of the program memory 214 includes the program elements for the main operation of the communication device and another secure part of the program memory, which includes the at least one secure management element for controlling data transmission, is isolated from the main part of the program memory 214 so that during the main operation of the wireless communication device, the processing unit 200 may only access the program elements in the main part of the program memory 214 and not the at least one secure management element of the secure environment.

The secure environment may also be implemented by a combination of hardware and software as would be readily apparent to a person skilled in the art.

The secure environment 218 may be implemented with the main operating system of the wireless communication device 102 using a hypervisor platform. A hypervisor entity is a small, verifiable, and highly trusted entity which mediates access to hardware resources and compartmentalizes the associated software into so called "virtual machines" within a computing system. Each virtual machine is effectively separated from another, allowing the creation of a secure environment virtual machine that is separated from the main operating system virtual machine.

An advantage of having a secure environment 218 isolated from the main operating system of the wireless communication device is that program elements or code in the secure environment is typically significantly smaller in size compared to the main operating system of the device (e.g. a modern main operating system typically consists of millions of lines of code, while secure environment software may be several thousand lines or less). This means that program elements in the secure environment can be verified, for example, using a Common Criteria Certification process, and so the integrity and security properties of the elements in the secure environment can be assured. This is generally not possible or practical for a main operating system having a size in the order of Mbytes. Thus, by including the at least one secure management element in a secure environment, the integrity of the at least one secure management element can be assured more easily.

For wireless M2M devices, in order to reduce cost, it has been proposed within the wireless standards groups (such as in 3GPP TR33.812, 'Feasibility Study on the Security Aspects of Remote Provisioning and Change of Subscription for M2M Equipment') that the USIM application be integrated into the M2M device itself in a secure environment rather than have the USIM application on a separate UICC. The secure environment for the USIM application may be software implemented or hardware implemented or a combination as described above (except for the implementation when the secure processing module is separate and removable). By avoiding the need for a separate UICC card for each M2M device, it may be possible to reduce costs. In the case when the USIM application is integrated into the wireless device 102, the secure environment for the USIM application may also include the at least one secure management element for controlling the data transmission of the wireless communication device in accordance with the disclosure.

In the example arrangement shown in FIG. 2, the secure environment 218 is shown in dotted lines as a separate element to the program memory 214 so as to represent the secure isolation from the main operating system e.g. isolation from the main program elements in the program memory 214 in a software implementation or isolation from the main processing unit in the hardware implementation.

Figure 3:
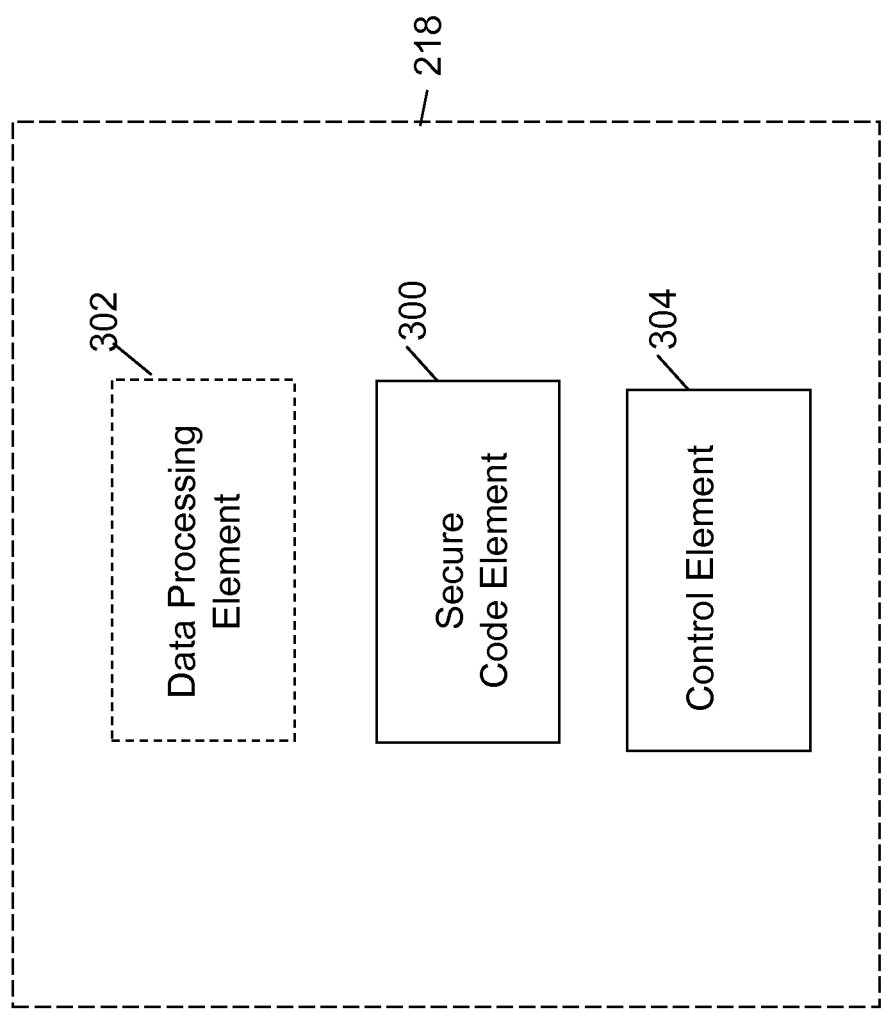
FIG. 3 is a block schematic diagram of an example of secure management elements in accordance with an embodiment of the disclosure in the secure environment of FIG. 2.

Referring now to FIG. 3 which shows an example embodiment of secure management elements in the secure environment 218 in accordance with the disclosure.

The at least one secure management element includes a secure code element 300 arranged to operate in the secure environment 218. The secure code element 300 is arranged to be provided with a secure code. A data processing element which may be part of the processing unit 200 or some other part of the wireless communication device 102 or which may be included in the secure environment (as shown by dotted line box 302 in FIG. 3) operates on data to be transmitted by the wireless communication device using the secure code to provide modified data. As will be explained in more detail below, the data processing element may operate on the data so that the data itself is changed (i.e. the modified data is changed data) or may operate on the data so that the original data remains unchanged but more data is added so that the modified data includes the original data plus additional data. The modified data is then provided to the transmitter section 207 for transmission. The modified data provided using the secure code is or corresponds to or represents valid data which will normally be deemed valid by a receiving device, such as the server 112. Data generated by the data processing element, or otherwise by the device, without using the secure code will be deemed invalid data and rejected by the receiving device. In the case when the data processing element is not included in the secure environment 218, since the secure code is used to generate the modified data, the secure code element 300 by means of the secure code has control over the modified data and only modified data that is generated using the secure code will be deemed valid data.

The secure code may be provided to the secure code element 300 or by the secure code element 300 generating the secure code in the secure code element 300. For example, the secure code may be provided to the secure code element 300 securely, for example, from a UICC via a secure interface. The secure code may alternatively be provided to the secure code element 300 by providing to the secure code element 300 a parameter identifying a desired character for data to be transmitted and by the secure code element 300 generating the secure code in the secure code element 300 using the at least one parameter. The character may include a desired size or a desired amount of data to be transmitted (e.g. per frame/packet), a desired transmission time for the transmission of data and a desired periodicity or frequency for transmission of data.

The at least one secure management element may further comprise a control element 304 for monitoring data transmitted by the wireless communication device 102 and for preventing further transmissions of data controlled by the secure code element when the data transmitted by the wireless communication device reaches a maximum limit. For example, the control element 304 may prevent the secure code being used to operate on the provided data once the maximum limit is reached.

Figure 4:
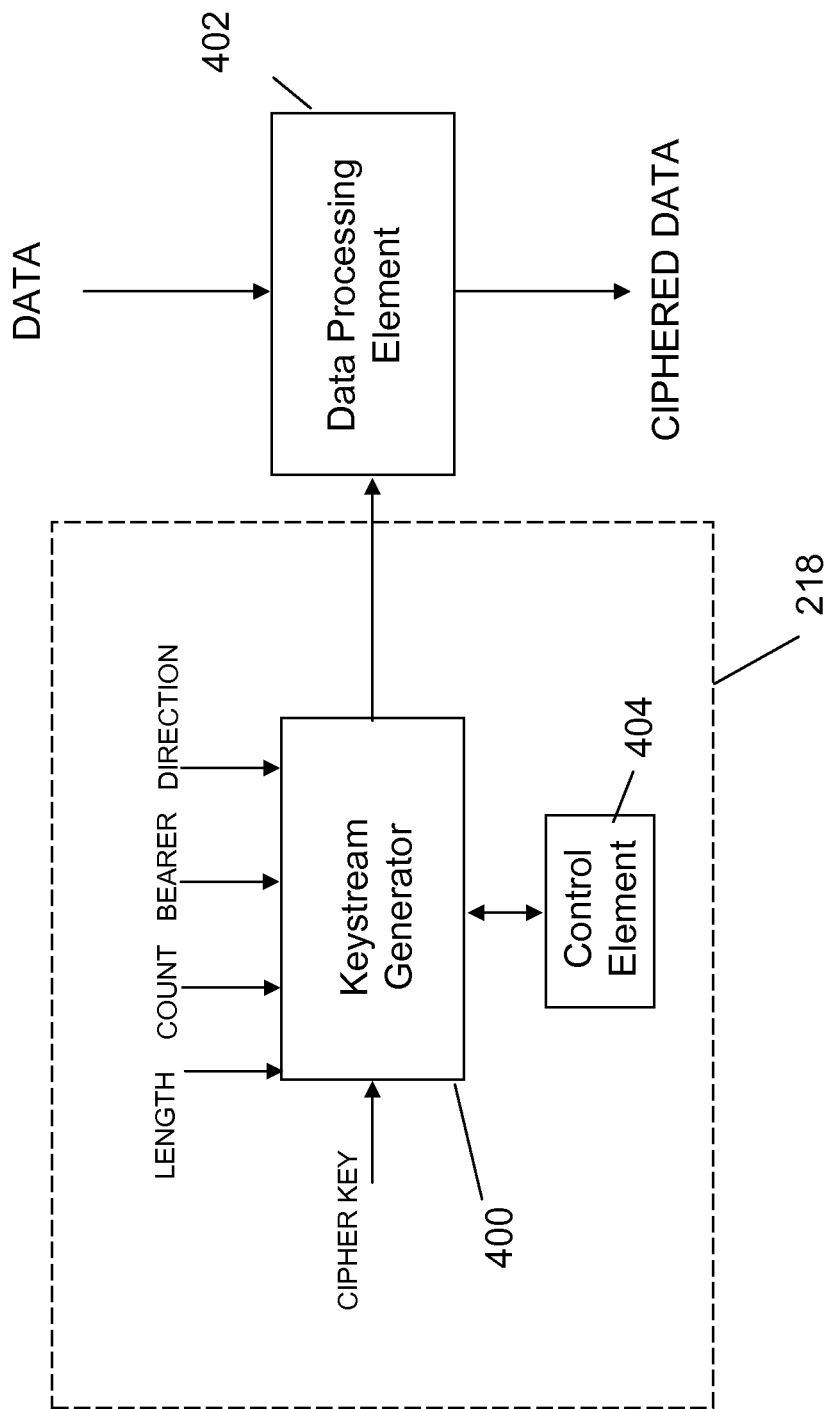
FIG. 4 is a block schematic diagram of another example of secure management elements in accordance with an embodiment of the disclosure in the secure environment of FIG. 2.

In an example arrangement shown in FIG. 4, the secure code element 300 includes a keystream generator 400, and the secure code is a keystream generated by the keystream generator 400. As shown in FIG. 4, a LENGTH parameter is provided, for example, from the processing unit 200, to the keystream generator 400. The LENGTH parameter defines a desired character for data to be transmitted. The desired character may include a desired size or a desired amount of data to be transmitted (e.g. per frame/packet), a desired transmission time for the transmission of data and a desired periodicity or frequency for transmission of data. The keystream generator 400 uses the LENGTH parameter together with a cipher key, which may be generated in the secure environment 218 (e.g. when the USIM application is integrated with the keystream generator 400) or provided to the keystream generator 400 from a UICC via a secure interface, to generate a keystream as is well known in the art (see for example 3GPP TS31.102, the whole disclosure of which is incorporated herein by reference). The keystream generated by the keystream generator 400 is therefore dependent on the LENGTH parameter. For example, the number of bits in the keystream may be determined by the LENGTH parameter. Typically, the LENGTH parameter defines the size or number of bits of keystream that the wireless device 102 uses to encrypt a particular Protocol Data Unit (PDU) or data packet and it will be decremented from a counter (not shown) held in the secure environment 218. The cipher key may be provided by a UICC or stored in the secure environment 218. In this example case, the LENGTH parameter, which defines the desired size of data, will be checked in the secure environment 218 (for example by the control element 304, 404 as will be described in more detail below) against a limit so that the secure environment can have overall control of the valid data transmitted by the wireless communication device.

Other parameters may be provided to the keystream generator 400 for use in generating the keystream which may include one or more of the following: a COUNT parameter which defines the number of the frame to be transmitted and which enables each frame to be encrypted with a different keystream; a BEARER parameter which identifies a particular bearer so that different keystreams are used for different bearers in the case of a device using more than one bearer; and a DIRECTION parameter which indicates whether the wireless communication device 102 is transmitting data on an uplink or receiving on a downlink. The DIRECTION parameter enables the keystream (i.e. the secure code) to be different for transmission of data and reception of data.

In the example shown in FIG. 4, the data processing element 402 is outside of the secure environment 218 and is arranged to combine the keystream generated by the keystream generator 400 with the data to be transmitted (e.g. per data packet) so as to provide ciphered data for transmission by the transmitting section 207. The ciphered data will be accepted as valid data by the receiving device, such as the server 112, which will perform a reverse operation on the ciphered data. For example, the receiving device will combine the ciphered data with a keystream generated in the receiving device using the LENGTH parameter (and other parameters if applicable, such as the COUNT parameter) provided in the header of the ciphered data, and which corresponds to the keystream generated in the wireless communication device 102, to decipher the ciphered data.

In the case when the LENGTH parameter defines a desired amount of data for each data packet, since each of the data packets of the ciphered data transmitted by the wireless communication device 102 is generated by a keystream and the keystream generated by the keystream generator 400 for a data packet is based on the LENGTH parameter, by adding up the LENGTH parameters used to generate the keystreams for the different data packets of the transmitted data, the amount of ciphered data transmitted can be monitored or tracked. The ciphered data or valid data transmitted by the wireless communication device 102 may therefore be controlled and managed by only generating a keystream for a data packet when the amount of ciphered data already transmitted is less than a limit (e.g. less than a maximum amount of data).

As discussed above, the LENGTH parameter may define the amount of data to be transmitted, the time of transmission and/or the periodicity or frequency of transmission. In the case when the LENGTH parameter indicates a time of transmission, the LENGTH parameter may be used by the keystream generator 400 to generate a keystream at a predetermined time according to the LENGTH parameter. Similarly, in the case when the LENGTH parameter indicates a periodicity or frequency of transmission, the LENGTH parameter may be used by the keystream generator 400 to generate keystreams periodically according to the frequency defined by the LENGTH parameter.

The at least one secure management element may further comprise a control element 404. The control element 404 monitors data transmitted by the wireless communication device 102, for example, by accumulating the LENGTH parameters provided to the keystream generator 400, and prevents further transmissions of data using a keystream when the data transmitted by the wireless communication device reaches a limit. The limit for the data transmitted by the communication device may be stored in the secure environment 218 (e.g. in the control element 404). The control element 404 may prevent further transmissions of ciphered data (e.g. once a certain amount of data has been transmitted or once a time limit has expired) by preventing the keystream generator 400 from generating keystreams when requested by the processing unit 200. Any data transmitted without using a keystream will not be properly deciphered at the receiving device (which is expecting and requiring all transmitted data to have been ciphered) and so will be rejected as not valid.

The at least one secure management element may further comprise a secure time source for providing a secure time reference for use in the secure environment 218. The secure time source may either be within the secure environment 218 or may transmit its values to the secure environment 218 in such a way that it is isolated from the main operating system of the wireless communication device 102 and thus, may be arranged to provide a secure time reference with reduced risk from tampering (for example, the time source may have its own backup power supply). A secure time reference is required when the LENGTH parameter and/or the limit defines a time limit or periodicity or frequency limit and will be used by the secure code element 300 (400) and the control element 304 (404) to control the transmission of valid data.

In alternative examples, the secure code may be a cipher key or a Message Authentication Code (MAC). In the case of a cipher key secure code, the cipher key is provided to the secure code element 300 (e.g. provided securely from a UICC or generated in the secure code element 300) and the data processing element 302 operates on the data to be transmitted by ciphering the data in the secure environment using the cipher key to provide ciphered data and the ciphered data is transmitted by the transmitting section 207. A control element 304 monitors the transmitted data, for example by counting the number of bytes that are received for encryption in each frame and accumulating the counted number, and when a limit has been reached prevents further transmissions of data using the cipher key by preventing the cipher key from being provided to the data processing element 302. Ciphered data received at a receiving device will be accepted as valid data. Data that has not been ciphered using the cipher key will be rejected as not valid.

In the case of a MAC, an integrity key is provided to the secure code element 300 (e.g. provided securely from a UICC or generated in the secure code element 300) and the secure code element 300 generates a MAC and provides the MAC to the data processing element 302 (which may be outside the secure environment 218). The data processing element 302 operates on the data to be transmitted by adding a MAC to the data to provide integrity protected data and the integrity protected data is transmitted by the transmitting section 207. A control element 304 monitors the transmitted data, for example by counting the number of bytes that are received for hashing in the secure environment 218 and accumulating the counted number, and when a limit has been reached prevents further transmissions of data using a MAC by preventing a MAC from being provided to the data processing element 302. Integrity protected data received at a receiving device will be accepted as valid data. Data that has not been protected with a MAC will be rejected as not valid.

The limit may be hardcoded in the control element 304 or may be updated securely by the communication network. Thus, the communication network can have overall control as to the maximum amount of data that is transmitted by the wireless communication device 102 by setting the limit to an appropriate value.

3GPP and Long Term Evolution (LTE) standards have developed a USIM authentication and (ciphering) key agreement algorithm (AKA) which supports transmission of authenticated operator messages directly to the USIM. Such a secure mechanism, for example using the Authentication Management Field (AMF) may also be used to update the limit stored in the control element 304 in the case when the USIM application is integrated with the control element 304 in the secure environment 218. More details of the AKA mechanism can be found in 3GPP TS 33.102, the whole disclosure of which is incorporated herein by reference.

For example, in case when the limit defines a maximum amount of data that may be sent by the wireless communication device 102 every month, when the wireless communication device 102 detects that it is nearing the limit for the amount of data sent in a given month, the wireless communication device 102 may send a message (digitally signed with a key under the control of the secure hardware or software in the secure environment 218) to the communication network informing the network of the approaching limit or informing the network of the amount of data transmitted that month for report generation on the network side. Based on the information in the message sent by the wireless communication device 102, the communication network can determine that the wireless communication device 102 is nearing the limit for that month and can (automatically or via an Authorisation by the owner of the wireless communication device, subject to policy) send an update message to the control element 304 in the secure environment 218 updating the limit so as to increase the amount of data that may be transmitted that month. For example, a full run of the AKA mechanism may be triggered by the communication network and then the update information may be sent in the AMF. An advantage of using the AKA mechanism is that the update message goes directly to the USIM application and so cannot be tampered with in transit in the main operating system of the wireless communication device 102.

Other methods, of sending updates securely to elements in the secure environment 218 may additionally or alternatively be used. For example, using the RSA algorithm and digitally signing the updates using a private key securely held in the communication network and where the public key needed to verify the signature is securely stored within the secure environment 218.

Figure 5:
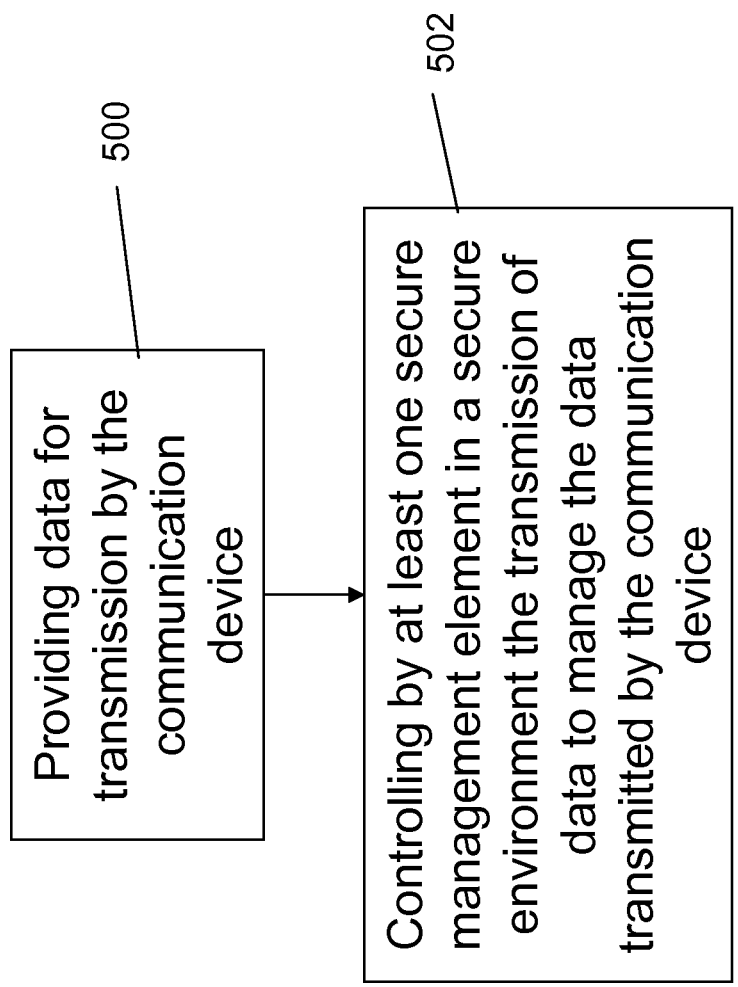
FIG. 5 is a flow diagram of an example method for managing data communication in accordance with an embodiment of the disclosure.

An example method for managing data communication between a communication device, such as wireless communication device 102, and another device in a communication network in accordance with the disclosure will now be described with further reference to FIG. 5.

At step 500, data is provided to the wireless communication device 102 for transmission. As discussed above, the data may be generated in the wireless communication device or may be generated in an external device (e.g. lap top) and provided to the wireless communication device (e.g. mobile phone) for transmission.

At step 502, the transmission of the provided data is controlled by at least one secure management element in the secure environment 218, such as the secure code element 300, so as to manage or limit the data transmitted by the wireless communication device.

It will be appreciated that although the description of the disclosure has so far focussed on controlling the transmission of data, the disclosure may also or alternatively be used in controlling the reception of data at the wireless communication device 102.

Figure 6:
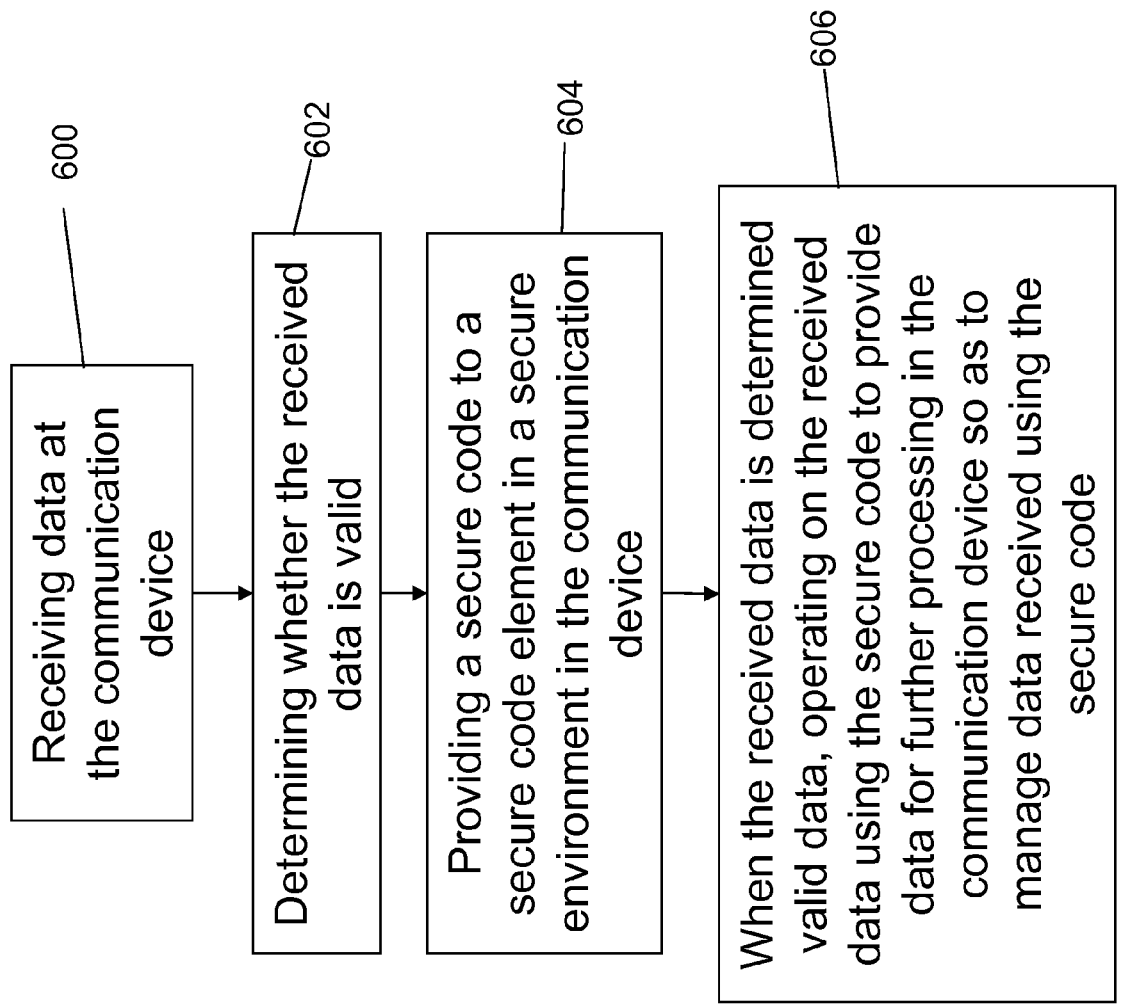
FIG. 6 is a flow diagram of an example method for managing data communication in accordance with another embodiment of the disclosure.

An example method for managing data communication between a communication device, such as wireless communication device 102, and another device in a communication network in accordance with the disclosure will now be described with reference to FIGS. 3 and 6. Similar processes as that described above with respect to the transmission of data are used and so the above description provides additional details for the following method of managing received data at the wireless communication device 102.

At step 600, data is received at the wireless communication device 102. The wireless communication device 102 then determines whether the received data is valid, step 602.

The determination is made by an element in the secure environment 218. For example, data may be deemed valid when it is received in a certain time window, and/or from an authorised device (e.g. using a digital signature).

A secure code, such as a keystream, cipher key or MAC, is provided to the secure code element 300 in the secure environment 218 in the wireless communication device 102, step 604. The secure code may be generated by the secure code element 300 or provided to the secure code element 300 e.g. from a UICC. When the received data is determined valid, the received data is then operated on using the secure code to provide data for further processing in the communication device so as to manage data received by the communication device using the secure code, step 606. The received data may be operated on by a data processing element 302 within the secure environment 218 or outside the secure environment 218. The operating on may include deciphering in the case when the secure code is a cipher key or combining a keystream with the received data in the case when the secure code is a keystream and the secure code element 300 is a keystream generator. By using the secure code to manage the received data, the received data is only made useful (i.e. can be further processed) once it has been determined to be valid. This means, for example, that only data received from an authorised user will be deemed valid and thus can be further processed by the wireless communication device 102 once operated on using the secure code. By using the secure code to make the received data useful, the data that can be processed by the wireless communication device can be controlled by the communication network in a secure manner with reduced risk of attack on the main operating system, via, for example, rogue values within the data.

In summary, the present disclosure controls the transmission of data from a communication device using at least one secure management element in a secure environment in the communication device so as to manage or limit the data transmitted by the communication device. Thus, the control and management of data transmissions can be moved from the communication network to the device which reduces the management and provisioning overhead in the network. By having the control in the device, the present disclosure facilitates easier scalability. Furthermore, by implementing the control in the secure environment, the present disclosure reduces the risk of tampering and unauthorised attack.

In devices in which the USIM application is integrated in a secure environment on the device or on a UICC, the controlling of the data transmission can be implemented with the USIM application (in the device or on the UICC) so as to leverage an existing secure environment with additional functionality.

It will be appreciated that the present disclosure applies to unicast, broadcast, multicast, wireless or wireline data transmission or reception.

In the foregoing description, the invention has been described with reference to specific examples of embodiments of the invention. It will, however, be evident that various modifications and changes may be made therein without departing from the broader scope of the invention as set forth in the appended claims.

The invention claimed is:

1. A method for managing data communication between a communication device and another device in a communication network, comprising:
   providing data for transmission by the communication device; and
   controlling by at least one secure management element operating in a secure environment in the communication device, separate from a main operation of the communication device, the transmission of the provided data by the communication device so as to manage data transmitted by the communication device, and so that data and program elements running in the secure environment cannot be accessed by the main operation of the communication device including a main operating system of the communication device, wherein controlling includes controlling an amount of data transmitted, controlling a time of transmission of data or controlling a periodicity for transmission of data; thereby preventing by the at least one secure management element further transmissions of data controlled by the at least one secure management element when the data transmitted by the communication device reaches a limit,
   wherein the at least one secure management element operating in the secure environment in the communication device operates on the provided data using a secure code to provide data in a modified form, and
   wherein the secure code is generated according to at least one parameter identifying at least one of the amount of data to be transmitted, the time of transmission of data, or the periodicity for transmission of data.

2. The method of claim 1, wherein the limit includes a maximum amount of data or a maximum time limit for transmission.

3. The method of claim 1, wherein the limit is stored in the secure environment.

4. The method of claim 3, further comprising exchanging authentication messages between the communication network and the communication device for updating securely the limit in the control element.

5. A method for managing data communication between a communication device and another device in a communication network, comprising:
   providing data for transmission by the communication device;
   controlling by at least one secure management element operating in a secure environment in the communication device, separate from a main operation of the communication device, the transmission of the provided data by the communication device so as to manage data transmitted by the communication device, wherein the at least one secure management element includes a secure code element operating in the secure environment and wherein controlling comprises:
   providing to the secure code element in the secure environment a secure code;
   and wherein the method further comprises in the communication device, operating on the provided data using the secure code to provide modified data representing valid data to another device; and
   transmitting by the communication device modified data to the another device so as to manage data transmissions by the communication device using the secure code,
   wherein the secure code is generated according to at least one parameter identifying at least one of an amount of data to be transmitted by the communication device, a time of transmission of data by the communication device, or a periodicity for transmission of data by the communication device.

6. The method of claim 5, wherein the secure code element includes a keystream generator and the secure code includes a keystream and wherein providing a secure code comprises generating a keystream by the keystream generator and wherein operating on includes combining the keystream with the provided data to provide ciphered data and transmitting comprises transmitting ciphered data.

7. The method of claim 6, wherein providing a secure code comprises providing the at least one parameter to the secure code element, and
generating the secure code in the secure code element using the at least one parameter, wherein the at least one parameter determines the number of bits in the keystream.

8. The method of claim 5, wherein the secure code is a cipher key and operating on comprises ciphering the provided data in the secure environment using the cipher key to provide ciphered data and transmitting comprises transmitting ciphered data.

9. A communication device for communicating with another device in a communication network, the communication device comprising:
a transmitter section for transmitting data; and
at least one secure management element arranged to operate in a secure environment in the communication device for controlling the transmission of data provided to the communication device so as to manage data transmitted by the transmitter, separate from a main operation of the communication device, and so that data and program elements running in the secure environment cannot be accessed by the main operation of the communication device including a main operating system of the communication device, wherein the at least one secure management element is arranged to at least one of control an amount of data transmitted, control a time of transmission of data or control a periodicity of transmission; and wherein the at least one secure management element further comprises a control element arranged to operate in the secure environment for preventing further transmissions of data controlled by the at least one secure management element when the data transmitted by the communication device reaches a limit,
wherein the communication device is arranged to operate on the provided data using a secure code to provide modified data, and
wherein the secure code is generated according to at least one parameter identifying at least one of the amount of data to be transmitted, the time of transmission of data, or the periodicity for transmission of data.

10. The communication device of claim 9, wherein the at least one secure management element includes a secure code element arranged to operate in the secure environment and wherein the secure code element is arranged to be provided with the secure code,
wherein the communication device further comprises a data processing element for operating on the provided data using the secure code to provide the modified data representing valid data to another device; and
wherein the transmitter is arranged to transmit modified data to the another device.

11. The communication device of claim 10, wherein the secure code element includes a keystream generator and the secure code includes a keystream generated by the keystream generator and wherein the data processing element is arranged to combine the keystream with the provided data to provide ciphered data for transmission by the transmitter.

12. The communication device of claim 9, wherein the limit includes a maximum amount of data or a maximum time limit for transmission.

13. The communication device of claim 12, wherein the maximum limit is stored in the control element.

* * * * *